United States Patent
Matsunami

(10) Patent No.: US 10,095,912 B2
(45) Date of Patent: Oct. 9, 2018

(54) BIOLOGICAL IMAGE PROCESSING DEVICE, BIOLOGICAL IMAGE PROCESSING METHOD, AND COMPUTER-READABLE NON-TRANSITORY MEDIUM

(71) Applicant: FUJITSU LIMITED, Kawasaki-shi, Kanagawa (JP)

(72) Inventor: Tomoaki Matsunami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 96 days.

(21) Appl. No.: 15/424,946

(22) Filed: Feb. 6, 2017

(65) Prior Publication Data
US 2017/0255815 A1   Sep. 7, 2017

(30) Foreign Application Priority Data

Mar. 3, 2016   (JP) .................................. 2016-041395

(51) Int. Cl.
*G06K 9/00* (2006.01)
*G06T 7/12* (2017.01)
(Continued)

(52) U.S. Cl.
CPC ....... *G06K 9/00067* (2013.01); *G06K 9/4604* (2013.01); *G06K 9/4642* (2013.01);
(Continued)

(58) Field of Classification Search
None
See application file for complete search history.

(56) References Cited

U.S. PATENT DOCUMENTS 5,586,199 A * 12/1996 Kanda ................. G06K 9/4609
                                                         382/197
6,298,157 B1 * 10/2001 Wilensky ............... G06T 3/403
                                                         382/199
(Continued)

FOREIGN PATENT DOCUMENTS

JP   2006-209363   8/2006
JP   2009-003492   1/2009
(Continued)

OTHER PUBLICATIONS

Zhang, D., Zuo, W., and Yue, F. 2012. A comparative study of palmprint recognition algorithms. ACM Comput. Surv. 44, 1, Article 2 (Jan. 2012), 37 pages.*
(Continued)

*Primary Examiner* — Kim Vu
*Assistant Examiner* — Nathan Bloom
(74) *Attorney, Agent, or Firm* — Fujitsu Patent Center

(57) ABSTRACT

A biological image processing device includes: a memory; and a processor coupled to the memory and the processor configured to execute a process, the process comprising: extracting at least one line from contours of a palm and principal lines of the palm shown in an image of the palm; extracting pixels of the line extracted by the extracting of at least one line; setting a local region for each of the pixels, each local region including each corresponding one of the pixels; calculating, for each local region, local orientations of the line extracted by the extracting of at least one line, in accordance with gradient intensities related to respective orientations of each corresponding local region; and calculating an orientation of the palm in accordance with a statistical amount of the respective local orientations.

20 Claims, 11 Drawing Sheets

(51) Int. Cl.
- *G06T 7/77* (2017.01)
- *G06K 9/46* (2006.01)
- *G06T 7/73* (2017.01)

(52) U.S. Cl.
CPC .................. *G06T 7/12* (2017.01); *G06T 7/73* (2017.01); *G06T 7/77* (2017.01); *G06K 2009/4666* (2013.01); *G06T 2207/30196* (2013.01)

(56) References Cited

U.S. PATENT DOCUMENTS

| | | | |
|---|---|---|---|
| 2006/0165264 | A1 | 7/2006 | Saitoh et al. |
| 2012/0169464 | A1 | 7/2012 | Aoki et al. |
| 2013/0259386 | A1* | 10/2013 | Chandrashekar .... G06K 9/4633 382/203 |
| 2015/0248575 | A1 | 9/2015 | Yamada et al. |
| 2016/0026857 | A1* | 1/2016 | Petyushko ............. G06K 9/481 382/103 |
| 2016/0182771 | A1* | 6/2016 | Oh ............................ G06T 7/73 348/578 |
| 2017/0242492 | A1* | 8/2017 | Horowitz ................ G06F 3/017 |

FOREIGN PATENT DOCUMENTS

| | | |
|---|---|---|
| JP | 2010-509672 | 3/2010 |
| JP | 2011-203822 | 10/2011 |
| JP | 2012-234440 | 11/2012 |
| JP | 5382127 | 1/2014 |
| WO | 2008054396 | 5/2008 |

OTHER PUBLICATIONS

Huang, De-Shuang, Wei Jia, and David Zhang. "Palmprint verification based on principal lines." Pattern Recognition 41.4 (2008): 1316-1328.*

P. Xinrong, T. Yangmeng and W. Jiaqiang, "A Survey of Palmprint Feature Extraction Algorithms," 2013 Fourth International Conference on Intelligent Systems Design and Engineering Applications, Zhangjiajie, 2013, pp. 57-63.*

Agarwal, Shalini, Pawan Kumar Verma, and Mohd Aamir Khan. "An optimized palm print recognition approach using Gabor filter." Computing, Communication and Networking Technologies (ICCCNT), 2017 8th International Conference on. IEEE, 2017.*

Fei, Lunke, et al. "Double-orientation code and nonlinear matching scheme for palmprint recognition." Pattern Recognition 49 (2016): 89-101.*

Dubey, Pawan, and Tirupathiraju Kanumuri. "Optimal local direction binary pattern based palmprint recognition." Computing for Sustainable Global Development (INDIACom), 2015 2nd International Conference on. IEEE, 2015.*

Extended European Search Report dated Jul. 19, 2017 for corresponding European Patent Application No. 17155367.0, 7 pages.

Li, Wenxin et al.,"Image alignment based on invariant features for palmprint identification", Signal Processing: Image Communication, Elsevier Science Publishers, Amsterdam, NL, vol. 18, No. 5, May 1, 2003, pp. 373-379, XP004416075.

Jia, Wei et al.,"Fast Palmprint Retrieval Using Principal Lines", IEEE International Conference on Systems, Man and Cybernetics, Piscataway, NJ, USA, Oct. 11, 2009, pp. 4118-4123, XP031575306.

Fei, Lunke et al.,"Half-orientation extraction of palmprint features", Pattern Recognition Letters, vol. 69, Jan. 1, 2016, pp. 35-41, XP029365739.

* cited by examiner

BIOLOGICAL IMAGE PROCESSING DEVICE, BIOLOGICAL IMAGE PROCESSING METHOD, AND COMPUTER-READABLE NON-TRANSITORY MEDIUM

CROSS-REFERENCE TO RELATED APPLICATION

This application is based upon and claims the benefit of priority of the prior Japanese Patent Application No. 2016-041395, filed on Mar. 3, 2016, the entire contents of which are incorporated herein by reference.

FIELD

A certain aspect of embodiments described herein relates to a biological image processing device, a biological image processing method, and a computer-readable non-transitory medium.

BACKGROUND

To reduce influence of a positional shift in the yaw direction, either a registered image or a verification image is rotated little by little in the yaw direction, and verification scores at all the angles are calculated. The combination having the highest score is then employed in correcting a shift in the yaw rotation (see Patent Document 1, for example).

Patent Document 1: Japanese Laid-Open Patent Publication No. 2009-003492

SUMMARY

However, while the authentication accuracy is increased by the setting of rotation angles at smaller intervals, a larger number of images need to be checked, resulting in higher computational costs.

According to an aspect of the present invention, there is provided a biological image processing device including: a memory; and a processor coupled to the memory and the processor configured to execute a process, the process comprising: extracting at least one line from contours of a palm and principal lines of the palm shown in an image of the palm; extracting pixels of the line extracted by the extracting of at least one line; setting a local region for each of the pixels, each local region including each corresponding one of the pixels; calculating, for each local region, local orientations of the line extracted by the extracting of at least one line, in accordance with gradient intensities related to respective orientations of each corresponding local region; and calculating an orientation of the palm in accordance with a statistical amount of the respective local orientations.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

The following is a description of embodiments, with reference to the drawings.

First Embodiment

Figure 1A:
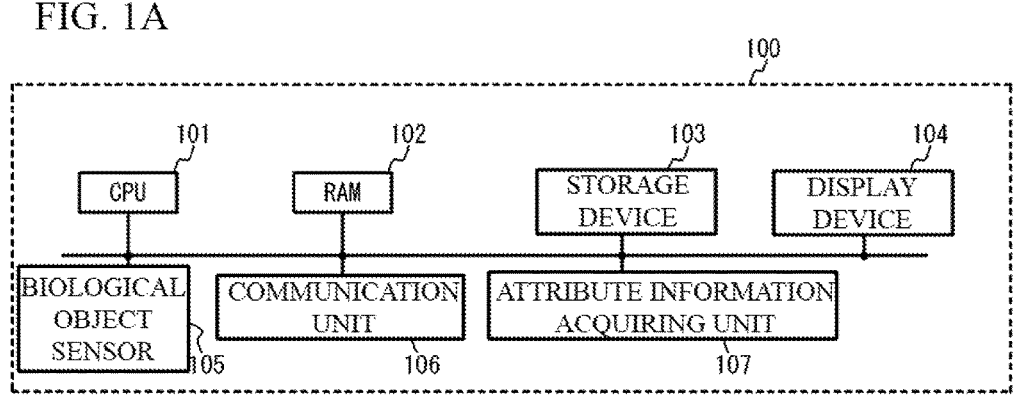
FIG. 1A is a block diagram for explaining the hardware configuration of a biometric authentication device according to a first embodiment.
Figure 1B:
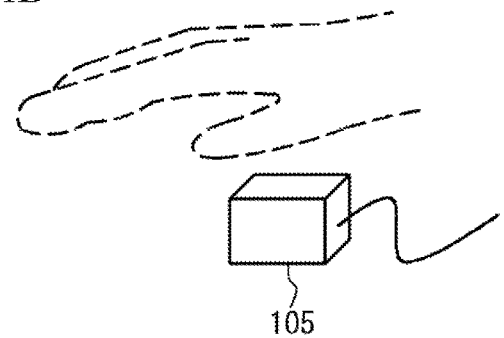
FIG. 1B is a schematic view of a biological object sensor.

FIG. 1A is a block diagram for explaining the hardware configuration of a biometric authentication device 100 according to a first embodiment. FIG. 1B is a schematic view of a biological object sensor 105, which will be described later. As shown in FIG. 1A, the biometric authentication device 100 includes a CPU 101, a RAM 102, a storage device 103, a display device 104, the biological object sensor 105, a communication unit 106, and an attribute information acquiring unit 107. These components are connected by a bus or the like.

The CPU (Central Processing Unit) 101 is a central processor. The CPU 101 includes one or more cores. The RAM (Random Access Memory) 102 is a volatile memory that temporarily stores a program to be executed by the CPU 101, data to be processed by the CPU 101, and the like.

The storage device 103 is a nonvolatile storage. For example, a read only memory (ROM), a solid-state drive (SSD) such as a flash memory, a hard disk to be driven by a hard disk drive, or the like can be used as the storage device 103. A biometric authentication program according to this embodiment is stored in the storage device 103. The display device 104 is a liquid crystal display, an electroluminescence panel, or the like, and displays the results of the later described processes and the like.

The biological object sensor 105 is a sensor that acquires biological information about a user, and acquires an image of the palm of the user's hand in a non-contact manner in this embodiment. As shown in the example in FIG. 1B, the biological object sensor 105 is a complementary metal oxide semiconductor (CMOS) camera, or the like. The biological object sensor 105 can acquire a palm pattern, the contours of the palm, the principal lines of the palm, and the like, in accordance with visible light information, for example. The principal lines of the palm include the line of Heart, the line of Head, and the line of Life. The biological object sensor 105 can also acquire vein patterns, using near infrared rays. Although an image of the palm is preferably an image of the entire palm including the finger tips, only the palm and the base portions of the fingers may be included in an image of the palm.

The communication unit 106 is a connection interface to a local area network (LAN), for example. The attribute information acquiring unit 107 is an input device such as a keyboard and a mouse, and is a device for inputting the ID, the username, the password, and the like for identifying the user, for example.

The biometric authentication program stored in the storage device 103 is loaded into the RAM 102 so that the program can be executed. The CPU 101 executes the biometric authentication program loaded into the RAM 102. Thus, the respective processes are carried out by the biometric authentication device 100. As the biometric authentication program is executed, a registration process, an authentication process, and the like are carried out.

The registration process is a process of registering biological features obtained from palm images acquired by the biological object sensor 105 in a database, associating the biological features with the respective users. In this embodiment, palm prints, vein patterns, palm shapes, or the like extracted from palm images are registered as the biological features in the database. The authentication process is a process of checking a verification biological feature acquired by the biological object sensor 105 against the corresponding biological feature registered in the database. In this embodiment, if the degree of similarity between a vein pattern acquired during the authentication process and a vein pattern registered in the database is equal to or higher than a threshold value, the user is determined to be a registered user. The registration process and the authentication process will be described later in detail.

Figure 2:
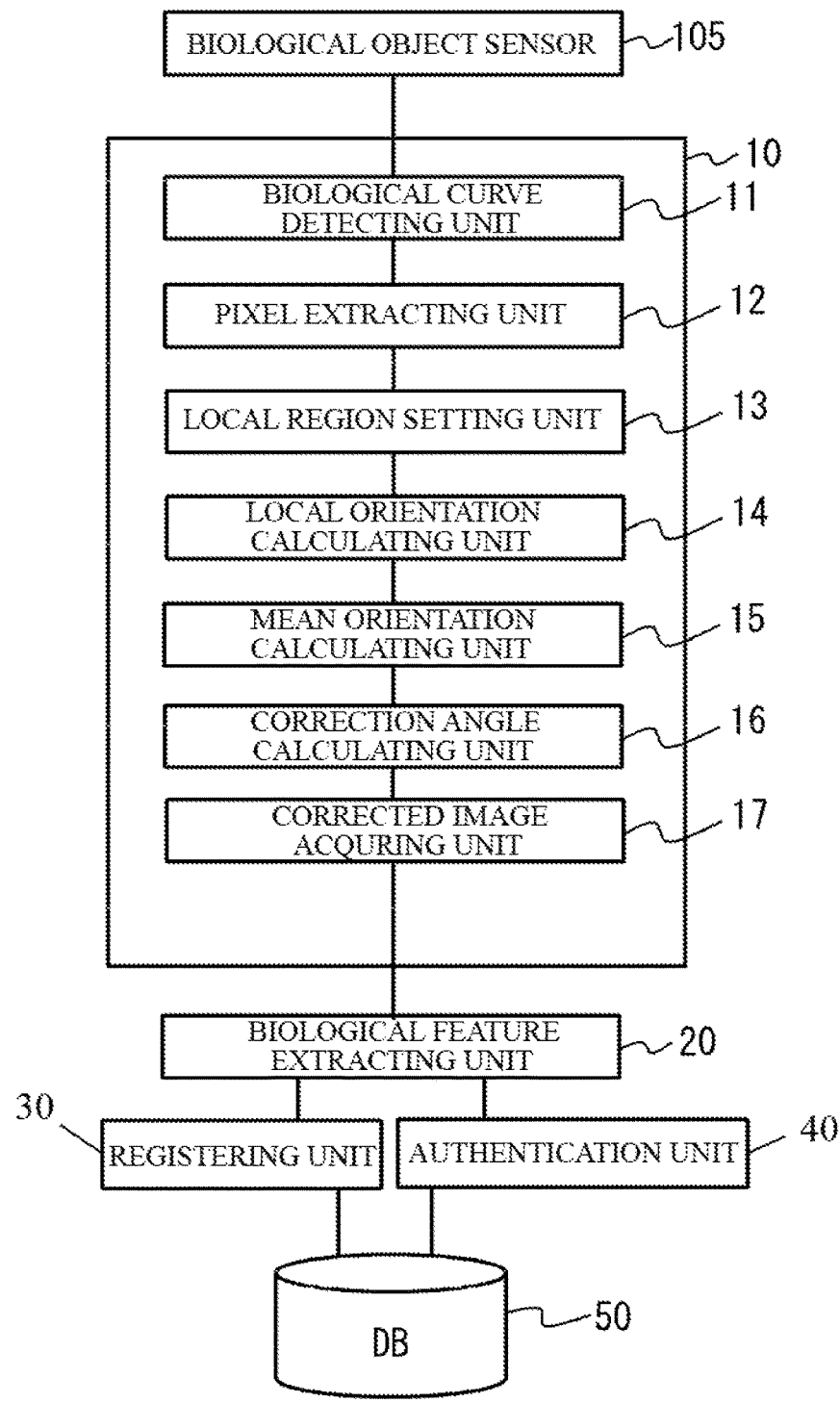
FIG. 2 is a block diagram showing the respective functions to be achieved through execution of a biometric authentication program.

FIG. 2 is a block diagram showing the respective functions to be achieved through execution of the biometric authentication program. As the biometric authentication program is executed, a correcting unit 10, a biological feature extracting unit 20, a registering unit 30, an authenticating unit 40, a database 50, and the like are formed. The correcting unit 10 has the functions of a biological image processing device. Therefore, of the biological authentication program, the program for forming the correcting unit 10 has the functions of a biological image processing program. The correcting unit 10 includes a biological curve detecting unit 11, a pixel extracting unit 12, a local region setting unit 13, a local orientation calculating unit 14, a mean orientation calculating unit 15, a correction angle calculating unit 16, and a corrected image acquiring unit 17. The example shown in FIGS. 1 and 2 is formed with a stand-alone terminal, but does not necessarily involve such a stand-alone terminal. For example, this embodiment can also be applied to a client server system. For ease of explanation, an example with a stand-along terminal is described in this embodiment.

Figure 3:
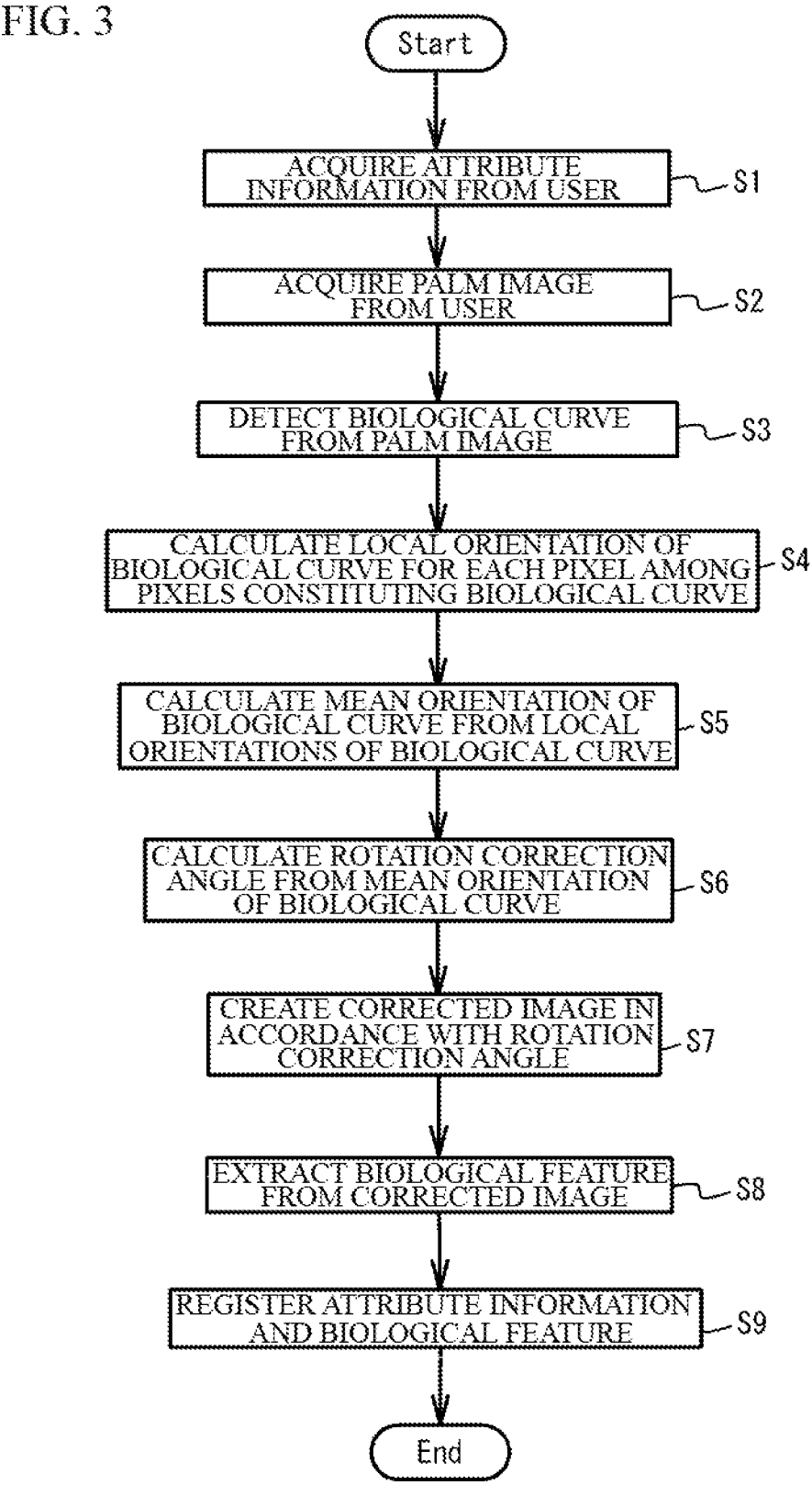
FIG. 3 is a flowchart showing an example of a registration process in detail.

(Registration Process) FIG. 3 is a flowchart showing an example of the registration process in detail. Referring to FIGS. 2 and 3, the registration process is described below. First, the attribute information acquiring unit 107 acquires attribution information about a user (step S1). The biological object sensor 105 then acquires a palm image of the user putting a hand above the biological object sensor 105 (step S2). The biological curve detecting unit 11 detects biological curves as edges from the palm image acquired by the biological object sensor 105, according to a known edge detection method, such as Sobel filtering or Laplacian filtering (step S3). In this specification, the contours of the palm and the principal lines of the palm are referred to as biological curves, and the pixels constituting the biological curves are referred to as biological curve pixels.

Figure 4:
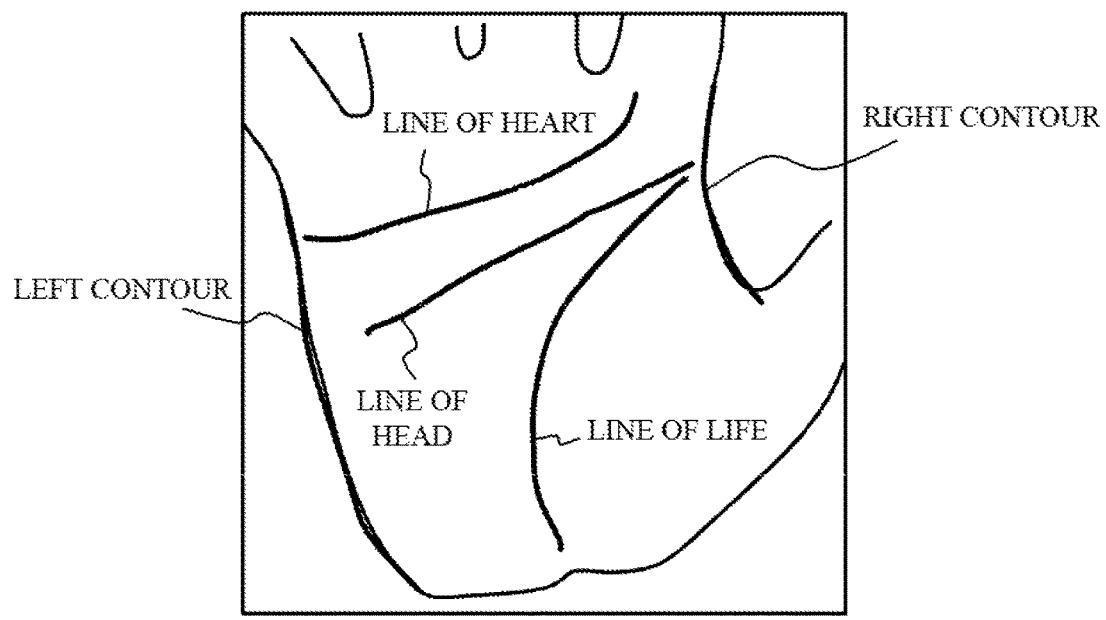
FIG. 4 is a diagram showing an example of a registration process in detail.

FIG. 4 shows an example of biological curves. In FIG. 4, the right and left contours, the line of Heart, the line of Head, and the line of Life are shown as an example of biological curves. In the following processes, only one biological curve may be used, or two or more biological curves may be used. However, the number and the types of the biological curves to be used are the same between the registration process and the authentication process.

The local orientation calculating unit 14 then calculates the local orientation of the biological curve of each pixel among the pixels constituting a biological curve (step S4). First, the pixel extracting unit 12 extracts the biological curve pixels from the biological curve extracted by the biological curve detecting unit 11. The local region setting unit 13 then sets a biological curve local region for each biological curve pixel. The biological curve local region is a smaller region than the palm image, with the biological curve pixel being the center. For example, the biological curve local region may be a rectangle region of i×j pixels, with the biological curve pixel being the center. Alternatively, the biological curve local region may be a circular region having a radius of r pixels, with the biological curve pixel being the center. In this embodiment, the contour of the little finger side of the palm is used as an example of the biological curve. The number of biological curve pixels and the number of biological curve local regions are represented by N. Each biological curve local region is a rectangle of 7×7 pixels, with the corresponding biological curve pixel being the center.

The local orientation calculating unit 14 then calculates local gradient intensities in predetermined directions θ for each biological curve local region. In the description below, angles are set so that the upward vertical direction in the image is 0 degrees, and a counterclockwise direction is a positive direction. The directions in which local gradient intensities are calculated are the four directions expressed as θ=k×45 degrees (k=0, 1, 2, 3). For each pixel in each biological curve local region, a differential filter of the respective directions θ shown below in the mathematical formula (1) is applied to the palm image, and the total sums of the absolute values of θ-direction differential filter responses in the biological curve local region are set as the local gradient intensities Gk(x, y) in the directions θ in the biological curve local region.

The local orientation calculating unit 14 then obtains a biological curve vector indicating the orientation of the biological curve pixel of the biological curve, from the local gradient intensities in the four directions in each biological curve local region. For each biological curve pixel (x, y), φ(x, y) is calculated according to the mathematical formula (2) shown below, where t=4. The mathematical formula (2) shown below represents local gradient intensities as vectors in which the directions are θ, and the size is Gk(x, y). Accordingly, the total sum of the vectors of these four directions is the vector indicating the orientation of the edge of the biological curve. The vector is then rotated 90 degrees, so that a biological curve orientation vector can be obtained. That is, φ(x, y)+90 degrees represents the biological curve local orientation.

In this embodiment, no distinction is made between directions with a difference of 180 degrees, such as 45 degrees and 225 degrees, and a local orientation is calculated as an angle between 0 degrees and 180 degrees. Therefore, in the mathematical formula (2) shown below, a biological curve orientation vector is calculated from a vector having an angle of a value twice greater than θ, and the orientation obtained by adding 90 degrees to half the angle formed by the biological curve orientation vector is set as the local orientation of the biological curve.

(Mathematical Formula 1)

$$\begin{pmatrix} 1 & 1 & 1 \\ 0 & 0 & 0 \\ -1 & -1 & -1 \end{pmatrix}_{\theta=0°} \begin{pmatrix} 1 & 1 & 0 \\ 1 & 0 & -1 \\ 0 & -1 & -1 \end{pmatrix}_{\theta=45°}$$

$$\begin{pmatrix} 1 & 0 & -1 \\ 1 & 0 & -1 \\ 1 & 0 & -1 \end{pmatrix}_{\theta=90°} \begin{pmatrix} 0 & -1 & -1 \\ 1 & 0 & -1 \\ 1 & 1 & 0 \end{pmatrix}_{\theta=135°}$$

(Mathematical Formula 2)

$$\varphi(x, y) = \frac{1}{2}\tan^{-1}\left(\frac{\sum_{k=0}^{t-1} G_k(x, y)\sin(2k \cdot 180°/t)}{\sum_{k=0}^{t-1} G_k(x, y)\cos(2k \cdot 180°/t)}\right)$$

Figure 5:
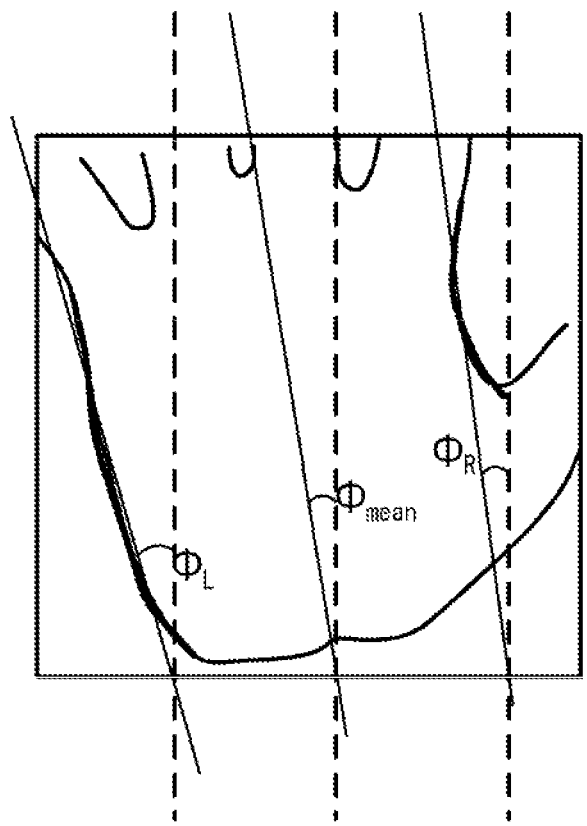
FIG. 5 is a diagram showing an example of the mean orientation of each biological curve.

The mean orientation calculating unit 15 then calculates the mean orientation Φ of the biological curve from the statistical amount of N local orientations calculated from N biological curve local regions (step S5). For example, the mean orientation calculating unit 15 calculates the mean value or the median value of N values as the mean orientation. In a case where two or more biological curves are used, the mean orientations of the respective biological curves are calculated, and are set as Φ1, Φ2, . . . , respectively. FIG. 5 is a diagram showing an example of the mean orientations of respective biological curves. FIG. 5 shows the mean orientation (ΦL of the contour of the little finger side (left side), the mean orientation ΦR of the contour of the thumb side (right side), and the mean orientation of these orientations.

The correction angle calculating unit 16 then calculates a rotation correction angle from the mean direction calculated from the respective biological curves (step S6). In a case where the mean orientation of a single biological curve is calculated, the value obtained by multiplying the mean direction by −1 is set as the rotation correction angle. In a case where the mean orientation of two or more biological curves is calculated, the value obtained by multiplying the mean value of the mean orientations Φ1, Φ2, . . . by −1 is set as the rotation correction angle.

Figure 6:
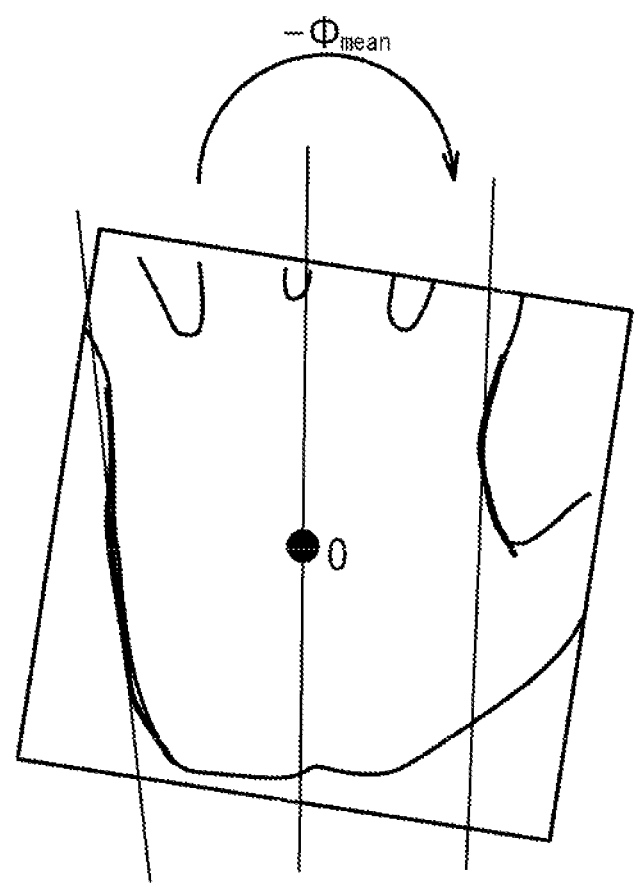
FIG. 6 is a diagram showing an example of rotation correction.

The corrected image acquiring unit 17 then rotates the palm image by the rotation correction angle, to create a corrected image (step S7). In this step, the center of rotation is the center of the palm image, or is the center of the gravity coordinates of an image that has the foreground region of the palm image as 1 and the background region as 0. FIG. 6 shows an example of rotation correction in a case where the right and left contours of the palm are used as the biological curves. Since the mean orientation of the two biological curves is represented by Φmean, the rotation correction angle is −Φmean, and an image obtained by rotating the biological image by −Φmean about the image center O is obtained as the corrected image.

The biological feature extracting unit 20 then extracts a biological feature from the corrected image (step S8). The biological feature is the vein pattern, the palm print, the shape of the palm, or the like. The vein pattern includes the coordinates and the orientations of the end points and the branch points of the veins, joint information about two branch points, and the like. The registering unit 30 then associates the biological feature extracted in step S8 with the attribute information acquired in step S1, and registers the attribute information and the biological feature in the database 50 (step S9). The biological feature registered in step S9 is referred to as a registered biological feature. Through the above procedures, the registration process is completed.

Figure 7:
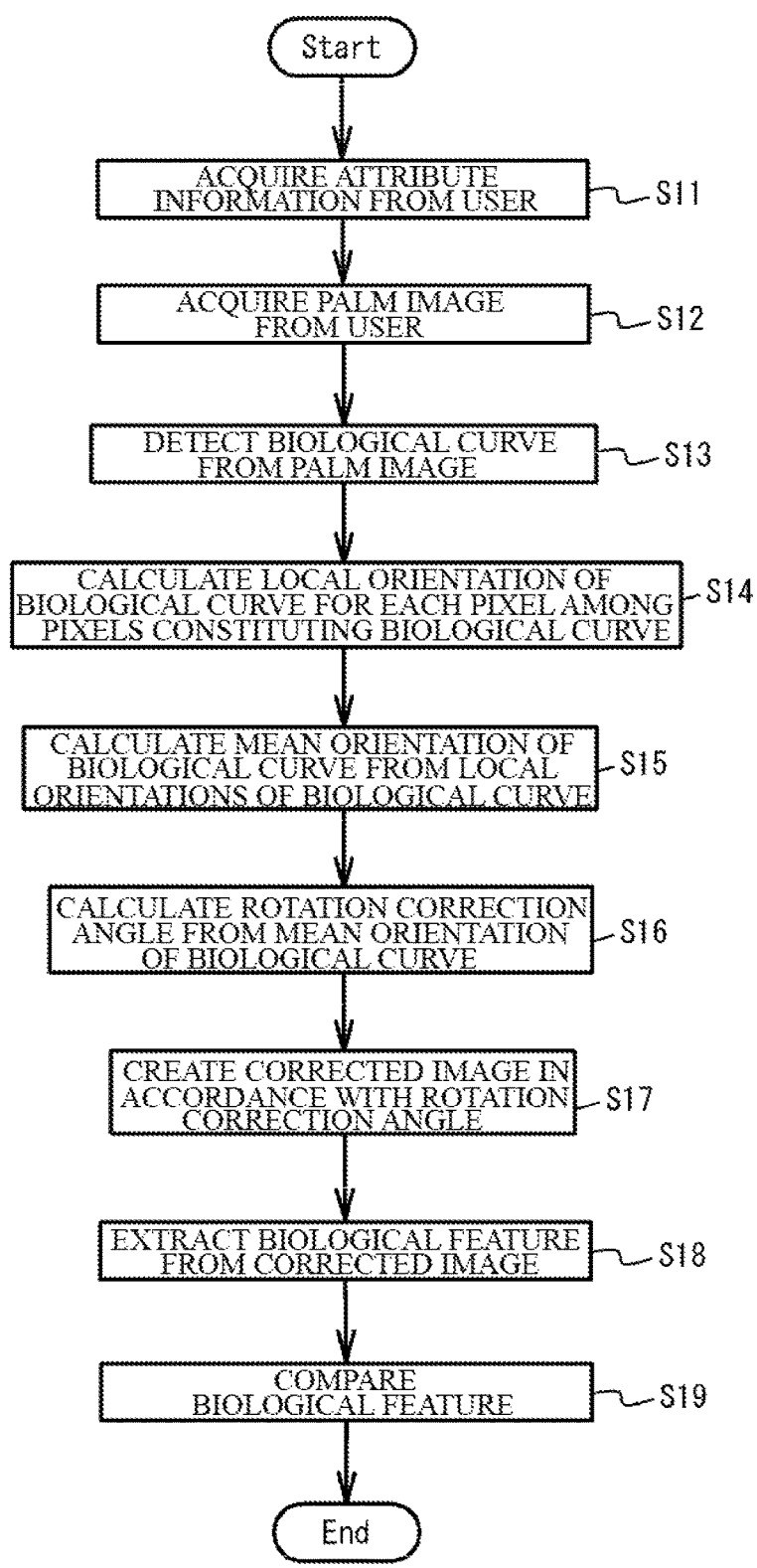
FIG. 7 is a flowchart showing an example of an authentication process in detail.

(Authentication Process) Next, the authentication process is described. FIG. 7 is a flowchart showing an example of the authentication process in detail. As shown in the example in FIG. 7, steps S11 through S18 are the same as steps S1 through S8 in FIG. 3. The biological feature obtained in step S18 is referred to as a verification biological feature. After step S18 is carried out, the authenticating unit 40 reads, from the database 50, the registered biological feature associated with the same attribute information as that acquired in step S11, and checks the verification biological feature against the registered biological feature (step S19). Specifically, the authenticating unit 40 determines whether the degree of similarity between the registered biological feature and the verification biological feature is not lower than a threshold value, and outputs the result of the determination.

According to this embodiment, the orientation of a biological curve is determined through calculation related to the pixels constituting the biological curve, so that the size of a positional shift due to rotation of a palm image. Thus, a rotation angle correction can be obtained at a low computational cost. Also, local orientations are turned into a vector and are thus combined in calculating the biological curve. Accordingly, a very small difference in angle can be expressed, and the accuracy of rotation angle calculation becomes higher. Consequently, an image that achieves a high authentication accuracy can be obtained. Further, the local orientations of the respective pixels constituting the biological curve are calculated, and the rotation angle of the palm image is calculated from the statistical amount of the calculated local orientations. Even if noise appears in part of the biological curve, the noise can be absorbed. Thus, a robust correction angle calculation can be performed.

In this embodiment, one-to-one authentication in which attribute information is obtained in the authentication process, and the registered biological feature to be checked against is identified with the attribute information has been described. However, this embodiment is not limited to that, and may be applied to one-to-N authentication in which attribute information is not obtained in the authentication process, and a verification biological feature is checked against two or more registered biological features. It should be noted that the same applies to the embodiments described below.

Second Embodiment

In a second embodiment, the local orientation calculating unit 14 calculates the local orientations of a biological curve, using Gabor filters. The Gabor filter is expressed by the mathematical formula (3) shown below. In a case where there is an edge of a component of the filter in a direction θ, a filter response amplifies. This can be used in calculating the local orientation of each biological curve pixel as described below. In the expression below, x'=x cos θ+y sin θ, and y'=−x sin θ+y cos θ.

(Mathematical Formula 3)

$$g(x, y, \lambda, \theta, \sigma) = \exp\left(-\frac{x'^2 + y'^2}{2\sigma^2}\right)\cos\left(2\pi\frac{x'}{\lambda}\right)$$

In this embodiment, the contour of the little finger side of the palm is used as an example of the biological curve. The number of biological curve pixels and the number of biological curve local regions are N. Each biological curve local region is a rectangle of 7×7 pixels, with the corresponding biological curve pixel being the center. As shown in the example in FIG. 5, the upward vertical direction in the image is 0 degrees, and the horizontal directions are ±90 degrees. In the Gabor filter shown in the above mathematical formula (3), x and y represent the coordinates of the pixel, λ, represents the wavelength of the filter, θ represents the orientation of the filter, and σ represents the size of the Gaussian variance. As an example of the respective parameters, λ, and σ are the mean width of the biological curve, and θ is the eight directions expressed as θ=k×22.5 degrees (k=0, ±1, ±2, ±3, 4).

First, for the pixels (i, j) included in each biological curve local region, the local orientation calculating unit 14 determines filter responses Gk(x, y, i, j) of the eight directions according to the above mathematical formula (3), and calculates Gk(x, y) by adding up Gk(x, y, i, j) of 7×7 or 49 pixels. The local orientation calculating unit 14 then calculates φ(x, y) of each biological curve pixel (x, y) according to the mathematical formula (2) of the first embodiment, with t being 8. As Gk(x, y) represents the intensity of the edge in each direction, the total sum of the vectors that have the direction θ and the size Gk(x, y) is calculated, so that the biological curve vector indicating the local orientations of the biological curve can be obtained. That is, φ(x, y) indicates the orientation of the biological curve vector. The process to be performed thereafter is the same as that in the first embodiment, with the biological curve local orientation being φ(x, y).

According to this embodiment, Gabor filter responses are calculated with respect to the pixels constituting a biological curve of a palm image, and thus, rotation angle correction can be performed at a low computational cost. Although a Gabor filter has discrete orientations, filter responses are turned into a vector and are combined, so that a very small difference in angle between local orientations of the respective pixels constituting the biological curve can be expressed, and the accuracy of rotation angle calculation becomes higher. Thus, an image that achieves a high authentication accuracy can be obtained.

Third Embodiment

In a third embodiment, the local orientation calculating unit 14 calculates local orientations of a biological curve, using orientation concentration ratios IR. An orientation concentration ratio IR(x, y) is expressed by the mathematical formula (4) shown below, and is calculated for each biological curve pixel. In the mathematical formula (4), Hypot(a, b)=√(a²+b²). IR is closer to 1 when the variance of the local gradient intensity in the biological curve local region is larger, and is closer to 0 when the variance is smaller. A threshold value Th_IR for orientation concentration rates is set. A biological curve pixel (x, y) that satisfies IR(x, y)≥Th_IR is a valid pixel, and a biological curve pixel (x, y) that satisfies IR(x, y)<Th_IR is an invalid pixel. The local orientation calculating unit 14 then calculates the mean value or the median value of the local orientations of the valid pixels, and sets the calculated value as the mean orientation Φ of the biological curve. The process to be performed thereafter is the same as that in the first embodiment.

(Mathematical Formula 4)

$$IR(x, y) = Hypot\left(\begin{array}{c}\sum_{k=0}^{t-1} G_k(x, y)\cos(2k \cdot 180°/t, \\ \sum_{k=0}^{t-1} G_k(x, y)\sin(2k \cdot 180°/t)\end{array}\right) / \sum_{k=0}^{t-1} G_k(x, y)$$

According to this embodiment, the orientation of a biological curve is determined through calculation related to the pixels constituting the biological curve, and thus, rotation angle correction can be performed at a low computational cost. Also, local orientations are turned into a vector and are combined in calculating the biological curve. With this, a very small difference in angle can be expressed, and the accuracy of rotation angle calculation can be increased. Accordingly, an image that achieves a high authentication accuracy can be obtained. In a case where noise that is an edge component not in the curve orientation appears in the biological curve, and the biological curve includes an unclear region, the pixels causing the noise are regarded as invalid pixels and are not used in calculating the biological curve orientation. Thus, the biological curve orientation can be calculated without any influence of noise, and robust rotation correction can be performed.

Fourth Embodiment

Figure 8:
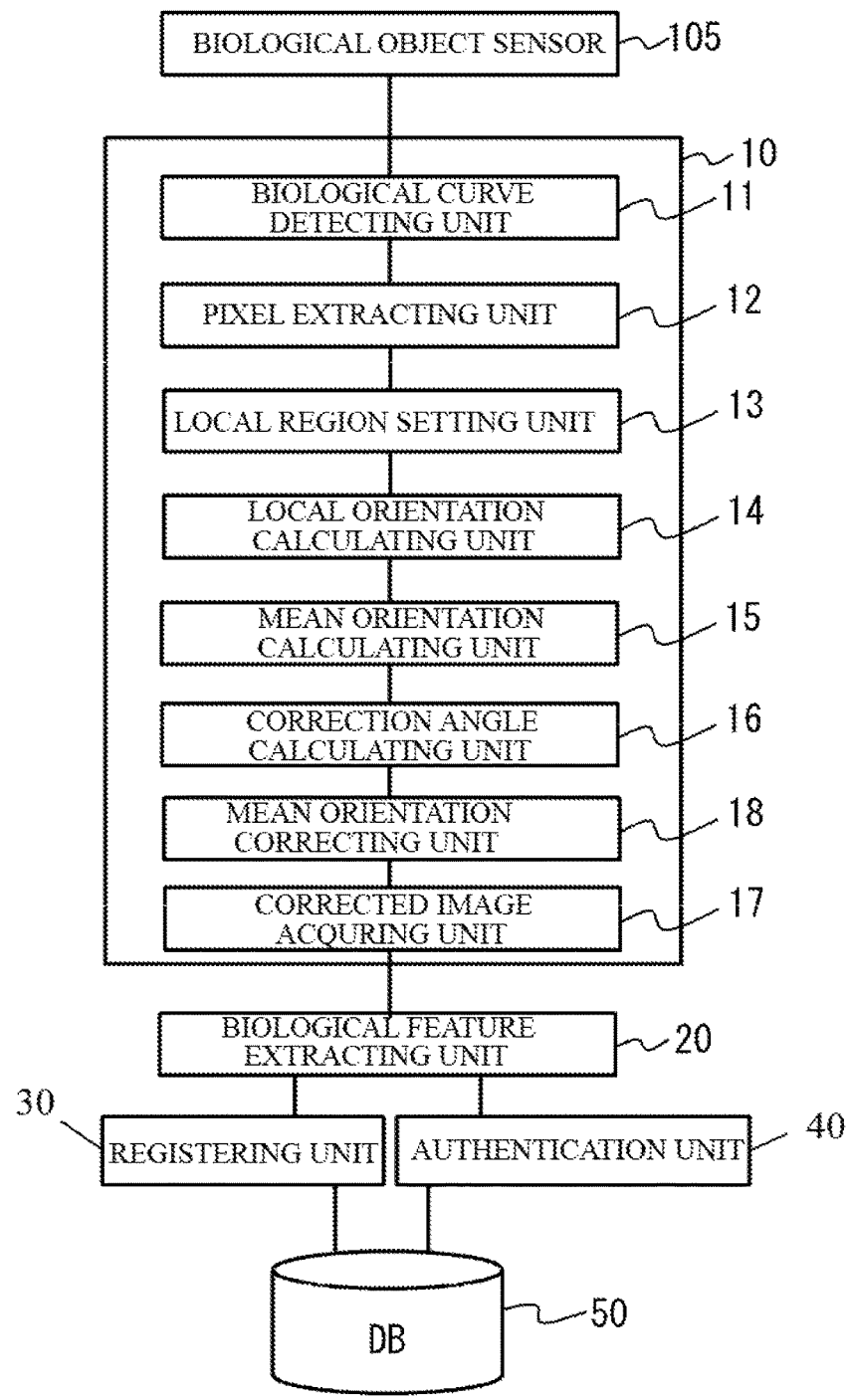
FIG. 8 is a block diagram showing the respective functions according to a third embodiment.

FIG. 8 is a block diagram showing the respective functions to be obtained through execution of a biological authentication program according to a third embodiment. The configuration of the biometric authentication device is the same as that shown in FIG. 1. As shown in the example in FIG. 8, the difference from FIG. 2 is that the correcting unit 10 further includes a mean orientation correcting unit 18.

Figure 9:
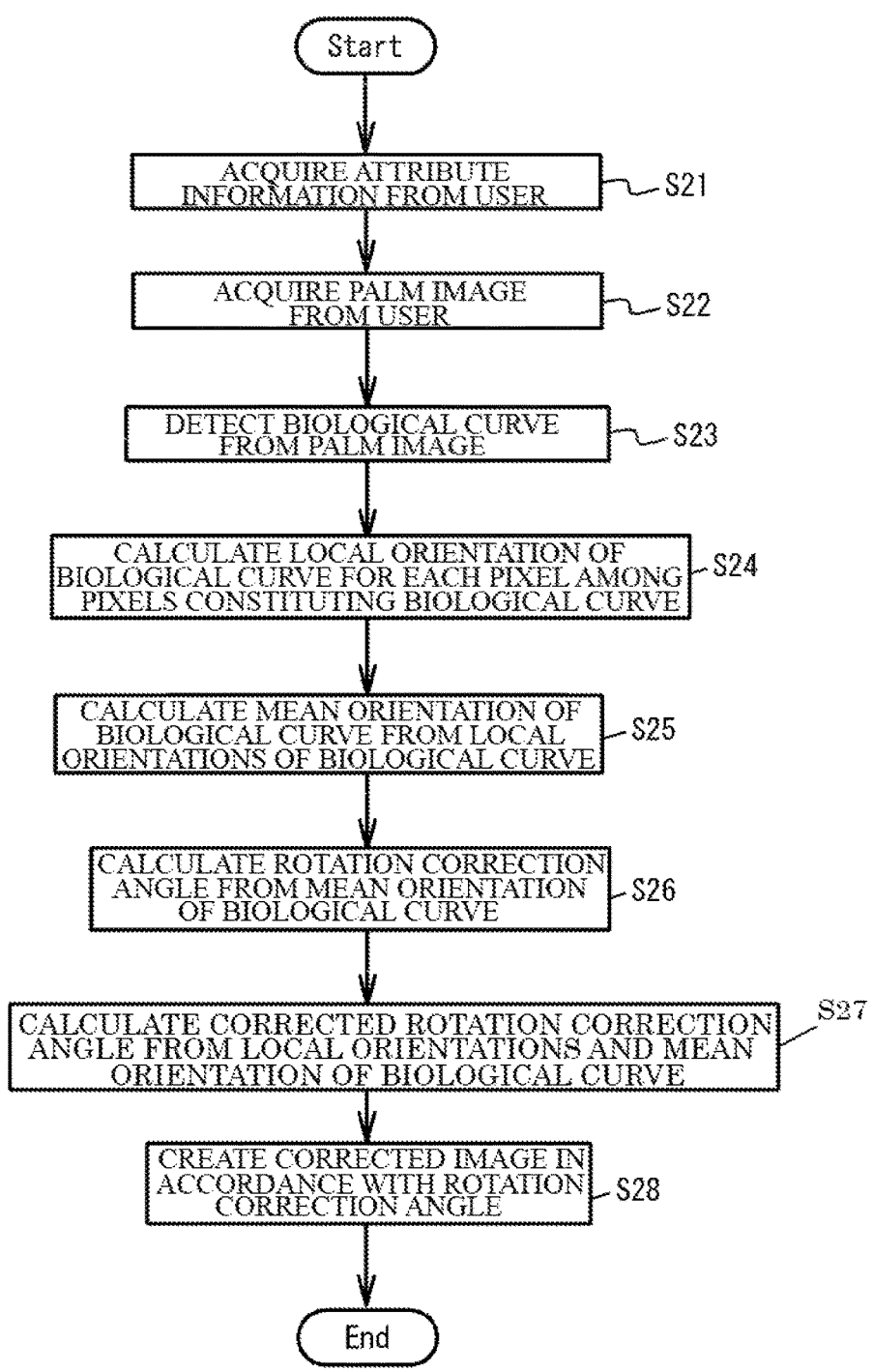
FIG. 9 shows an example of a flowchart.

FIG. 9 is a flowchart showing an example process to be performed in place of steps S1 through S7 of FIG. 3 and steps S11 through S17 of FIG. 7. As shown in the example in FIG. 9, steps S21 through S26 are the same as steps S1 through S6 of FIG. 3 and steps S11 through S16 of FIG. 7. After step S26 is carried out, the mean orientation correcting unit 18 calculates a corrected rotation correction angle from the local orientations of the biological curve and the mean orientation of these local orientations (step S27). After that, the corrected image acquiring unit 17 rotates the biological image by the rotation correction angle, to acquire a corrected image (step S28).

In the description below, step S27 is described in detail. The mean orientation correcting unit 18 determines valid pixels that are some of biological curve pixels (x, y) having local orientations φ(x, y) calculated by the local orientation calculating unit 14. The angle differences between the local orientations φ(x, y) of the valid pixels and the mean orientation Φ of the biological curve calculated by the mean orientation calculating unit 15 are equal to or smaller than a predetermined threshold value. The mean orientation correcting unit 18 also determines invalid pixels. The angle differences between the local orientations φ(x, y) of the invalid pixels and the mean orientation Φ of the biological curve are larger than the predetermined threshold value. The angle difference between the mean orientation Φ and a local orientation φ(x, y), and the predetermined threshold value are cos(Φ−φ(x, y)) and cos(π/8), respectively, for example. The mean orientation correcting unit 18 then calculates the mean value or the median value of the orientation directions of the valid pixels among the biological curve pixels, and sets the calculated value as a corrected biological curve mean orientation Φ'. That is, a rotation correction angle is determined.

Figure 10:
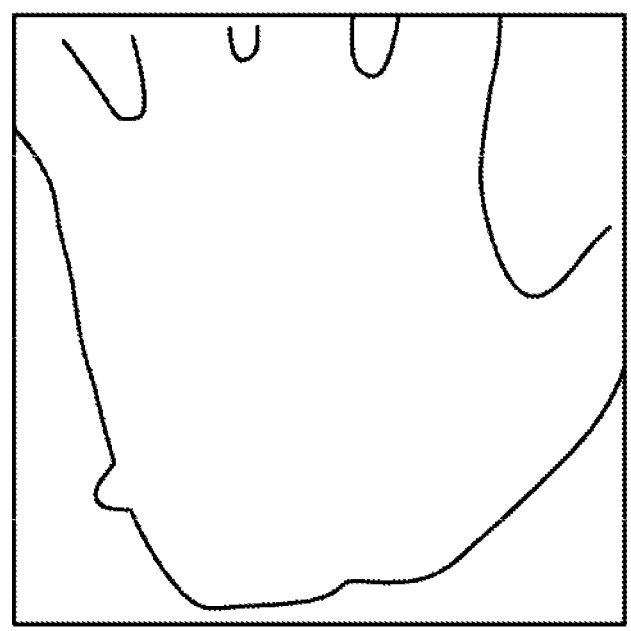
FIG. 10 is a diagram showing an example of irregular noise.
Figure 11:
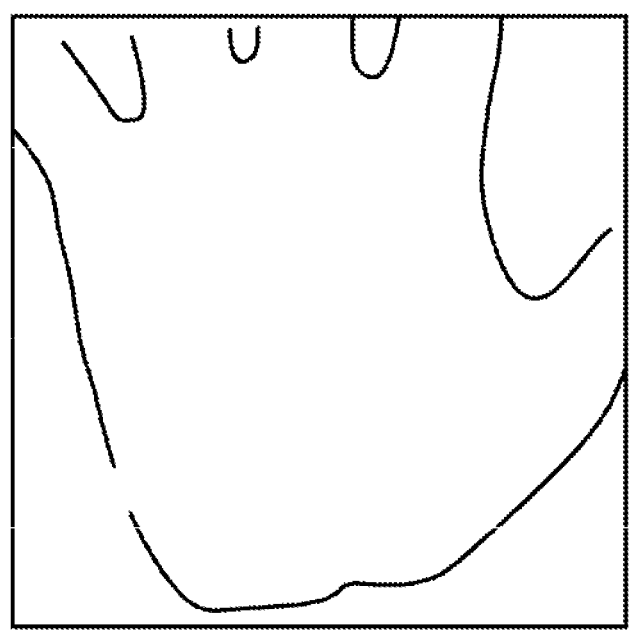
FIG. 11 is a diagram showing an example of a biological curve from which irregular noise has been removed.

FIG. 10 is a diagram showing an example of irregular noise. FIG. 11 is a diagram showing an example of the biological curve from which the irregular noise has been removed. Such irregular noise might appear in a case where an object other than a palm exists in the background region. Even in such a case, the local orientation of the portion of the biological curve at which the irregular noise has appeared greatly deviates from the mean orientation. Thus, only the irregular portion can be removed as shown in FIG. 11, and the influence of noise can be further reduced.

According to this embodiment, the orientation of a biological curve is determined through calculation related to the pixels constituting the biological curve, and thus, rotation angle correction can be performed at a low computational cost. Also, local orientations are turned into a vector and are combined in calculating the biological curve. With this, a very small difference in angle can be expressed, and the accuracy of rotation angle calculation can be increased. Accordingly, an image that achieves a high authentication accuracy can be obtained. In a case where an irregular portion appears in a biological curve, pixels having large angle differences between the mean orientation Φ and the local orientations φ(x, y) are regarded as invalid pixels, and these invalid pixels are not used in calculating the biological curve orientation. Thus, the biological curve orientation can be calculated without any influence of irregular noise appearing in the biological curve, and robust rotation correction can be performed.

In each of the above described embodiments, the biological curve detecting unit 11 functions as an example of the line extracting unit that extracts at least one line from the contours of a palm and the principal lines of the palm in an image of the palm. The pixel extracting unit 12 functions as an example of the pixel extracting unit that extracts the pixels of the line extracted by the line extracting unit. The local region setting unit 13 functions as an example of the local region setting unit that sets a local region including each corresponding one of the pixels. The local orientation calculating unit 14 functions as an example of the local orientation calculating unit that calculates local orientations of the line extracted by the line extracting unit, in accordance with the gradient intensities of each corresponding one of the local regions. The mean orientation calculating unit 15 functions as an example of the orientation calculating unit that calculates the orientation of the palm from the statistical amount of the respective local orientations.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A biological image processing device comprising:
a memory; and
a processor coupled to the memory and the processor configured to execute a process, the process comprising:
extracting at least one line from contours of a palm and principal lines of the palm shown in an image of the palm;
extracting pixels of the line extracted by the extracting of at least one line;
setting a local region for each of the pixels, each local region including each corresponding one of the pixels;
calculating, for each local region, local orientations of the line extracted by the extracting of at least one line, in accordance with gradient intensities related to respective orientations of each corresponding local region;
calculating an orientation of the palm in accordance with a statistical amount of the respective local orientations; and
rotating the palm of the image, based on the orientation of the palm.

2. The biological image processing device as claimed in claim 1, wherein:
in the extracting of at least one line, a plurality of lines are extracted from the contours and the principal lines of the palm; and
in the calculating of an orientation, the orientation of the palm is calculated in accordance with a statistical amount of the local orientations of the respective lines.

3. The biological image processing device as claimed in claim 1, wherein in the setting, rectangular regions including the respective pixels are set as the local regions.

4. The biological image processing device as claimed in claim 1, wherein in the setting, circles around the respective pixels are set as the local regions.

5. The biological image processing device as claimed in claim 1, wherein in the calculating of an orientation, a mean orientation of the at least one line extracted by the extracting of at least one line is calculated in accordance with a statistical amount of the local orientations, and the orientation of the palm is calculated from the mean orientation.

6. The biological image processing device as claimed in claim 1, wherein in the calculating of an orientation, the local orientations are calculated, using a plurality of Gabor filters of different directions.

7. The biological image processing device as claimed in claim 1, wherein in the calculating of an orientation, the pixels are classified into valid pixels and invalid pixels in accordance with gradient intensity variation among the local regions, the local orientations of the valid pixels are calculated, and the orientation of the palm is calculated from a statistical amount of the respective local orientations of the valid pixels.

8. A biological image processing method, comprising:
extracting at least one line from contours of a palm and principal lines of the palm shown in an image of the palm;
extracting pixels of the line extracted by the line extracting unit;
setting a local region for each of the pixels, each local region including each corresponding one of the pixels;
calculating, for each local region, local orientations of the line extracted by the line extracting unit, in accordance with gradient intensities related to respective orientations of each corresponding local region;

calculating an orientation of the palm in accordance with a statistical amount of the respective local orientations; and rotating the palm of the image, based on the orientation of the palm.

9. The biological image processing method as claimed in claim 8, wherein:

in the extracting of at least one line, a plurality of lines are extracted from the contours and the principal lines of the palm; and in the calculating of an orientation, the orientation of the palm is calculated in accordance with a statistical amount of the local orientations of the respective lines.

10. The biological image processing method as claimed in claim 8, wherein in the setting, rectangular regions including the respective pixels are set as the local regions.

11. The biological image processing method as claimed in claim 8, wherein in the setting, circles around the respective pixels are set as the local regions.

12. The biological image processing method as claimed in claim 8, wherein in the calculating of an orientation, a mean orientation of the at least one line extracted by the extracting of at least one line is calculated in accordance with a statistical amount of the local orientations, and the orientation of the palm is calculated from the mean orientation.

13. The biological image processing method as claimed in claim 8, wherein in the calculating of an orientation, the local orientations are calculated, using a plurality of Gabor filters of different directions.

14. The biological image processing method as claimed in claim 8, wherein in the calculating of an orientation, the pixels are calculated into valid pixels and invalid pixels in accordance with gradient intensity variation among the local regions, the local orientations of the valid pixels are calculated, and the orientation of the palm is calculated from a statistical amount of the respective local orientations of the valid pixels.

15. A computer readable, non-transitory medium storing a program that causes a computer to execute a process, the process comprising:

extracting at least one line from contours of a palm and principal lines of the palm shown in an image of the palm;

extracting pixels of the extracted line;

setting a local region for each of the pixels, each local region including each corresponding one of the pixels;

calculating, for each local region, local orientations of the extracted line, in accordance with gradient intensities related to respective orientations of each corresponding local region;

calculating an orientation of the palm in accordance with a statistical amount of the respective local orientations; and rotating the palm of the image, based on the orientation of the palm.

16. The medium as claimed in claim 15, wherein:

in the extracting of at least one line, a plurality of lines are extracted from the contours and the principal lines of the palm; and in the calculating of an orientation, the orientation of the palm is calculated in accordance with a statistical amount of the local orientations of the respective lines.

17. The medium as claimed in claim 15, wherein in the setting, rectangular regions including the respective pixels are set as the local regions.

18. The medium as claimed in claim 15, wherein in the setting, circles around the respective pixels are set as the local regions.

19. The medium as claimed in claim 15, wherein in the calculating of an orientation, a mean orientation of the at least one line extracted by the extracting of at least one line is calculated in accordance with a statistical amount of the local orientations, and the orientation of the palm is calculated from the mean orientation.

20. The medium as claimed in claim 15, wherein in the calculating of an orientation, the local orientations are calculated, using a plurality of Gabor filters of different directions.

* * * * *